(12) United States Patent
Bellanca et al.

(10) Patent No.: US 7,636,193 B2
(45) Date of Patent: Dec. 22, 2009

(54) VISIBLE LIGHT-TRANSMISSIVE IR FILTER WITH DISTORTED PORTIONS

(75) Inventors: Michelle M. Bellanca, Stillwater, MN (US); Andrew J. Ouderkirk, Woodbury, MN (US); Hung T. Tran, Woodbury, MN (US); Michael F. Weber, Shoreview, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 332 days.

(21) Appl. No.: 11/381,261

(22) Filed: May 2, 2006

(65) Prior Publication Data

US 2007/0258133 A1 Nov. 8, 2007

(51) Int. Cl.
*G02B 5/20* (2006.01)
*F21V 9/04* (2006.01)

(52) U.S. Cl. ...................................... 359/359; 359/589
(58) Field of Classification Search ................... 359/359
See application file for complete search history.

(56) References Cited

U.S. PATENT DOCUMENTS

| | | | |
|---|---|---|---|
| 3,536,894 A | 10/1970 | Travioli | |
| 3,610,729 A | 10/1971 | Rogers | |
| 3,711,176 A | 1/1973 | Alfrey Jr. et al. | |
| 4,446,305 A | 5/1984 | Rogers et al. | |
| 4,540,623 A | 9/1985 | Im et al. | |
| 5,005,873 A | 4/1991 | West | |
| 5,300,764 A | 4/1994 | Hoshino et al. | |
| 5,448,404 A | 9/1995 | Schrenk et al. | |
| 5,882,774 A | 3/1999 | Jonza et al. | |
| 6,024,455 A * | 2/2000 | O'Neill et al. | 359/530 |
| 6,034,813 A | 3/2000 | Woodard et al. | |
| 6,045,894 A | 4/2000 | Jonza et al. | |
| 6,049,419 A | 4/2000 | Wheatley et al. | |

(Continued)

FOREIGN PATENT DOCUMENTS

EP 1 350 618 10/2003

(Continued)

OTHER PUBLICATIONS

International Standard, ISO/IEC 7810, "Identification cards—Physical characteristics", Third edition, Nov. 1, 2003.

(Continued)

*Primary Examiner*—Joshua L Pritchett
(74) *Attorney, Agent, or Firm*—Robert V. Heiti (57) ABSTRACT

The present application discloses filters and methods of making filters. In one aspect, a filter comprises a multilayer optical film (MOF) having a first reflection band, the MOF including distorted portions, the distorted portions having a second reflection band different from the first reflection band, a transparent outer layer disposed on a first side of the MOF, and an IR blocking material residing on the MOF and between the transparent outer layer and the MOF, wherein the IR blocking material is selectively disposed in the distorted portions. In another aspect, a method of producing a filter comprises the steps of providing a multilayer optical film (MOF) having a first reflection band, distorting portions of the MOF, the distorted portions having a second reflection band, different from the first reflection band, and transferring a layer of IR blocking material to the distorted portions of the MOF.

11 Claims, 4 Drawing Sheets

U.S. PATENT DOCUMENTS

| | | | |
|---|---|---|---|
| D436,620 S | 1/2001 | Webb et al. | |
| D438,562 S | 3/2001 | Webb et al. | |
| D438,563 S | 3/2001 | Webb et al. | |
| D442,222 S | 5/2001 | Webb et al. | |
| D442,627 S | 5/2001 | Webb et al. | |
| D442,628 S | 5/2001 | Webb et al. | |
| D442,629 S | 5/2001 | Webb et al. | |
| D443,298 S | 6/2001 | Webb et al. | |
| D447,515 S | 9/2001 | Faenza, Jr. et al. | |
| 6,290,137 B1 | 9/2001 | Kiekhaefer | |
| D449,336 S | 10/2001 | Webb et al. | |
| 6,296,188 B1 | 10/2001 | Kiekhaefer | |
| 6,368,699 B1 | 4/2002 | Gilbert et al. | |
| 6,395,124 B1 | 5/2002 | Oxman et al. | |
| 6,451,414 B1 | 9/2002 | Wheatley et al. | |
| 6,459,514 B2 | 10/2002 | Gilbert et al. | |
| 6,510,993 B1 | 1/2003 | Kiekhaefer | |
| 6,531,230 B1 | 3/2003 | Weber et al. | |
| 6,534,158 B2 | 3/2003 | Huang et al. | |
| 6,569,515 B2 | 5/2003 | Hebrink et al. | |
| 6,581,839 B1 | 6/2003 | Lasch et al. | |
| 6,630,283 B1 | 10/2003 | Simpson et al. | |
| 6,705,530 B2 | 3/2004 | Kiekhaefer | |
| 6,732,936 B1 | 5/2004 | Kiekhaefer | |
| 6,749,123 B2 | 6/2004 | Lasch et al. | |
| 6,764,014 B2 | 7/2004 | Lasch et al. | |
| 6,783,349 B2 | 8/2004 | Neavin et al. | |
| 6,808,658 B2 | 10/2004 | Stover | |
| 6,927,900 B2 | 8/2005 | Liu et al. | |
| 2002/0066790 A1 | 6/2002 | Cocco | |
| 2002/0130186 A1 | 9/2002 | Lasch et al. | |
| 2002/0145049 A1 | 10/2002 | Lasch et al. | |
| 2002/0163179 A1 | 11/2002 | Dubner et al. | |
| 2003/0017312 A1 | 1/2003 | Labrousse et al. | |
| 2003/0141373 A1 | 7/2003 | Lasch et al. | |
| 2003/0217806 A1 | 11/2003 | Tait et al. | |
| 2004/0020992 A1 | 2/2004 | Lasch et al. | |
| 2004/0046034 A1 | 3/2004 | Ey Yamani et al. | |
| 2004/0118930 A1 | 6/2004 | Berardi et al. | |
| 2004/0125450 A1 | 7/2004 | Hebrink et al. | |
| 2004/0256469 A1 | 12/2004 | Faenza, Jr. et al. | |
| 2005/0051633 A1 | 3/2005 | Lasch et al. | |
| 2005/0259326 A1 | 11/2005 | Weber et al. | |
| 2007/0139775 A1* | 6/2007 | Reich et al. | 359/515 |
| 2007/0258133 A1* | 11/2007 | Bellanca et al. | 359/359 |

FOREIGN PATENT DOCUMENTS

| | | |
|---|---|---|
| WO | WO 99/39224 | 8/1999 |
| WO | WO 01/18745 | 3/2001 |
| WO | WO 01/25872 | 4/2001 |
| WO | WO 01/41044 | 6/2001 |
| WO | WO 02/05204 | 1/2002 |
| WO | WO 02/45008 | 6/2002 |

OTHER PUBLICATIONS

"Light Transmissive Cards with Suppression of UV-Induced Fluorescence", Mar. 9, 2005, IP.com.

U.S. Application entitled "Light Transmissive Cards with Suppression of UV-induced Fluorescence", filed on Mar. 4, 2005, having U.S. Appl. No. 11/072,154.

U.S. Application entitled "Cards and Laminates Incorporating Multilayer Optical Films", filed on May 18, 2005, having U.S. Appl. No. 11/132,114.

Vikuiti Technical Bulletin, 75-0500-5281-2, Feb. 2006, © 3M.
Vikuiti Technical Bulletin, 75-0500-5282-0, Feb. 2006, © 3M.
Vikuiti Technical Bulletin, 75-0500-5283-8, Feb. 2006, © 3M.
Vikuiti Technical Bulletin, 75-0500-5284-6, Feb. 2006, © 3M.
Weber, Michael F., "Giant Birefringent Optics in Multilayer Polymer Mirrors", Science, vol. 287, Mar. 31, 2000.

* cited by examiner

VISIBLE LIGHT-TRANSMISSIVE IR FILTER WITH DISTORTED PORTIONS

FIELD OF INVENTION

The present application relates to infrared (IR) blocking filters.

BACKGROUND

Transparent financial transaction cards and the like can be made with a multilayer interference film whose individual layer thicknesses are tailored to produce a reflection band that reflects infrared (IR) light while transmitting some or all visible light, the multilayer film thus serving as an effective IR filter. Such an IR filter is desirable so that the card, even though it is light-transmissive, can be sensed by IR-based detection systems in automatic teller machines and the like.

Figure 1:
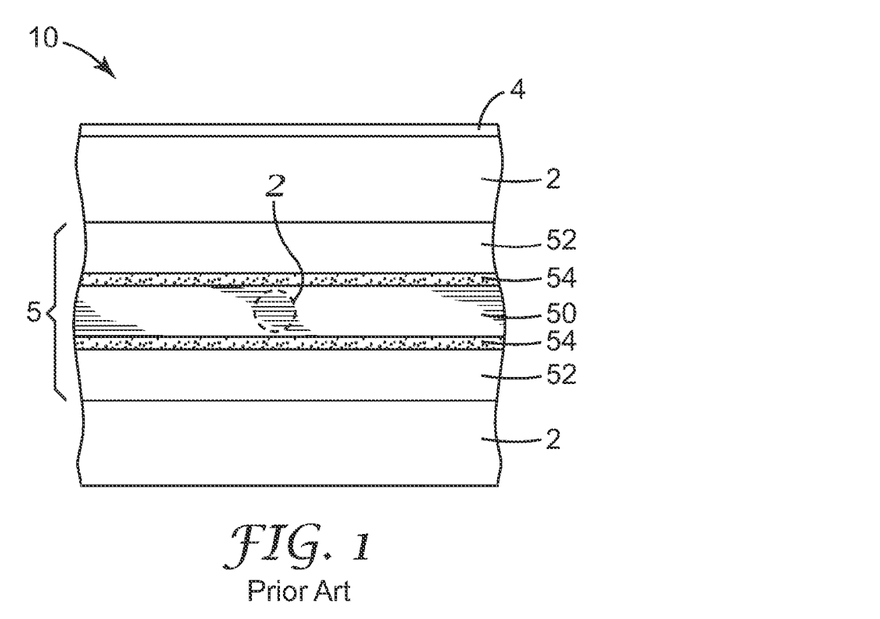
FIG. 1 shows an exemplary card construction.

FIG. 1 shows an exemplary laminate construction for a financial transaction card 10. In this construction, the card is transparent or translucent and it contains an IR blocking filter 5. The IR blocking filter 5 allows the transparent card to be properly detected by an ATM card reader. Such cards are disclosed in U.S. Pat. No. 6,764,014, titled "Transaction Card", issued Jul. 20, 2004 (Lasch et al.). The IR filter 5 includes an inner layer of multilayer optical film 50 selected to reflect in the infrared wavelength region and two outer layers 52 (typically polyvinyl chloride or PVC) laminated on either side of the multilayer optical film 50 using adhesive 54. One commercially available form of an IR blocking filter is marketed as Vikuiti™ Clear Card Filter by 3M Company, St. Paul, Minn. In an exemplary card application, the IR blocking filter can be placed in the center of the construction of the card 10, as shown in FIG. 1. The filter 5 including its outer layers 52 can be further laminated with additional outer plastic layers 2, typically PVC, on both sides of the filter 5. A printed layer 4 and optional PVC overlay layers can also be added.

SUMMARY

The present application discloses filters and methods of making filters. In one aspect, a filter comprises a multilayer optical film (MOF) having a first reflection band, the MOF including distorted portions, the distorted portions having a second reflection band different from the first reflection band, a transparent outer layer disposed on a first side of the MOF, and an IR blocking material residing on the MOF and between the transparent outer layer and the MOF, wherein the IR blocking material is selectively disposed in the distorted portions. In another aspect, a method of producing a filter comprises the steps of providing a multilayer optical film (MOF) having a first reflection band, distorting portions of the MOF, the distorted portions having a second reflection band, different from the first reflection band, and transferring a layer of IR blocking material to the distorted portions of the MOF.

The above summary of the present invention is not intended to describe each disclosed embodiment or every implementation of the present invention. These and other aspects of the present application will be apparent from the detailed description below. In no event should the above summaries be construed as limitations on the claimed subject matter. The claimed subject matter is defined solely by the attached claims, which may be amended during prosecution.

BRIEF DESCRIPTION OF THE DRAWINGS

The invention may be more completely understood in consideration of the following detailed description of various embodiments of the invention in connection with the accompanying drawings, where like reference numerals designate like elements. The appended drawings are intended to be illustrative examples and are not intended to be limiting. Sizes of various elements in the drawings are approximate and may not be to scale.

DETAILED DESCRIPTION

Multilayer optical film can be used in construction of wavelength selective filters. One example of such filters is the IR blocking filter 5 shown in FIG. 1. Filters comprising interference based polymeric multilayer optical films can have striking visual effects. The reflection band(s) of interference films shift in wavelength as a function of incidence angle, thus giving rise to color shifting or changing features. Such films can exhibit one appearance (e.g. a first color) at a first viewing angle but a different appearance (e.g. a second color) at a second, different viewing angle. Even more interesting color changing features can be made by embossing or otherwise distorting a polymeric multilayer optical film with various indicia, such as logos, emblems, security features and the like.

Transparent financial transaction cards can be made with multilayer interference film(s) whose individual layer thicknesses are tailored to produce a reflection band that reflects infrared (IR) light while transmitting some or all visible light, the multilayer film thus serving as an effective IR filter. Such an IR filter is desirable so that the card, even though it is light-transmissive, can be sensed by IR-based detection systems in automatic teller machines and the like.

Embossing a multilayer optical film, however, causes distortion of the microlayers within the optical film which can change the reflection band spectrum causing different wavelengths to be reflected by the embossed portions than the non-embossed portions. When a card incorporating an embossed filter is used in an IR-based detection system, the change in the reflection spectrum can be enough to result in the card being undetected. The present application discloses filters and methods of making filters designed to compensate for the change in the spectral characteristics of the filter due to distortion from embossing and the like.

Multilayer optical films (MOFs) are typically designed to selectively reflect certain narrow, targeted portions of the electromagnetic spectrum. Multilayer optical films can be designed to reflect only selected wavelengths of the spectrum while transmitting other wavelengths. For some applications (e.g. projection screens and other display systems), the selected wavelengths to be reflected will be in the visible range of the spectrum. For other applications (e.g. security markings, IR blocking filters, UV blocking filters) the multilayer optical films can be designed to reflect other selected wavelengths including without limitation infrared (IR) and ultraviolet (UV) wavelengths.

Multilayer optical films are interference-based films that can be designed in the form of polarizers or mirrors. As referred to herein, MOF reflective polarizers substantially reflect light having one polarization of light, while substantially transmitting the other polarization. Co-extruded polymeric reflective polarizers reflect linearly polarized light. MOF mirrors substantially reflect both polarizations of light.

Multilayer optical films, i.e., films that provide desirable transmission and/or reflection properties at least partially by an arrangement of microlayers of differing refractive index, are known. Multilayer optical films have been demonstrated by coextrusion of alternating polymer layers (see, e.g., U.S. Pat. Nos. 3,610,729 (Rogers), 4,446,305 (Rogers et al.), 4,540,623 (Im et al.), 5,448,404 (Schrenk et al.), and 5,882,774 (Jonza et al.)). In these co-extruded polymeric multilayer optical films, polymer materials are used predominantly or exclusively in the makeup of the individual layers. Such films are compatible with high volume manufacturing processes, and can be made in large sheets and roll goods.

Co-extruded polymeric multilayer optical films are generally formed using alternating layers of polymer materials with different indices of refraction. Typically, any polymer can be used as long as the polymer is relatively transparent over the wavelength range of transmission. For polarizing applications, the first optical layers, the second optical layers, or both are formed using polymers that are or can be made birefringent. Birefringent polymers can also be used in non-polarizing applications.

Figure 2:
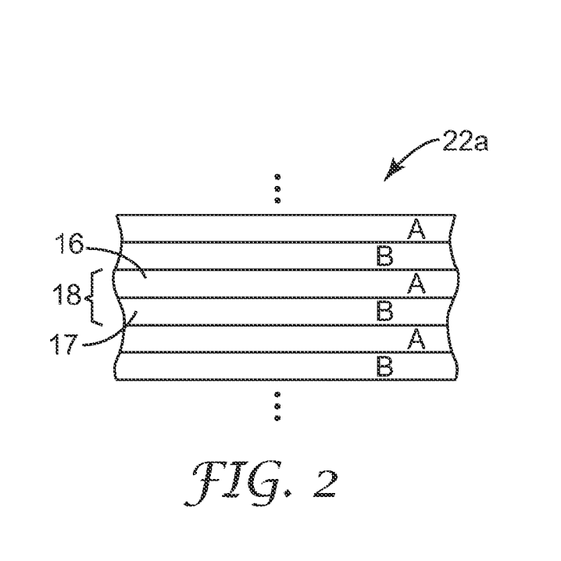
FIG. 2 is a schematic diagram of an exemplary interference stack reflector.

FIG. 2 shows an expanded view of an exemplary construction of a multilayer optical film comprising microlayers. FIG. 2 shows a single interference stack 22a having alternating layers A and B (16 and 17, respectively). Each repeating group of microlayers, in this case AB, forms an optical repeat unit 18. Other interference stack designs can also be used, including any of the optical repeat units known in the art. For example, optical repeat units having more than two microlayers (e.g. ABC; CACDBD; 7A1B1A7B1A1B) are also contemplated. A multilayer optical film can include one or more interference stacks. An interference stack can be designed to have one or more reflection bands. A multilayer optical film used for the filters described herein typically has a first reflection band. When used in transparent cards, the first reflection band is preferably an infrared reflection band. Other embodiments are also contemplated, including for example, a multilayer optical film having a plurality of reflection bands, reflection band(s) in the visible wavelengths or reflection band(s) in the UV region of the spectrum.

As used herein, "film" refers to an extended optical body whose thickness is generally much thinner than its lateral dimensions. In some instances a film can be attached or applied to another optical body such as a rigid substrate or another film having suitable reflection or transmission properties. The film can also be in a physically flexible form, whether it is free-standing or attached to other flexible layer (s).

Embossing multilayer optical film is one example of distorting portions of such film. Additional methods of distorting portions of the MOF include scribing, whether mechanical or laser, partial slitting, partial cutting, and other similar means. Color contrast between distorted and undistorted portions may be achieved by thinning the optical layers of the optical film locally. Within this affected region, a new color that also color shifts is evident against the unaffected region. To affect a localized thinning of layers in the optical film, one convenient method is embossing at temperatures above the glass transition temperatures of all of the polymers in the film and/or with suitable pressure. Localized thinning of layers can also be achieved by bombardment with high energy particles, ultrasonics, thermoforming or laser heating.

Distorting here refers mainly to the process of locally thinning the layers while constraining the film to remain substantially planar in form. However, distorting the film with raised or depressed lines, shapes, or letters can achieve similar effects.

The multilayer optical film may be an infrared mirror that is clear and transparent at normal incidence, or it may reflect infrared light as well as some or most wavelengths of visible light or ultraviolet light at normal incidence. For example, a film that reflects (in addition to IR light) all visible wavelengths except blue has a gold appearance in reflected light, and then as the reflection band shifts at oblique angles to cover the entire visible spectrum the color of the reflected light changes to silver or white. The distorted portions may reflect different wavelengths of visible light at different angles of incidence than the remaining areas of the film, or the features may be visible only in the infrared or in the ultraviolet. The distorted portions consist of small areas of the film which have been modified in refractive index or thickness. A film can have one or more such distorted portions. A distorted portion typically has a second reflection band, different from the first reflection band of the undistorted portions of the MOF. Furthermore, a plurality of different distorted portions can be provided, and each one can have a different reflection band, or the second reflection bands can be designed to be similar. The second reflection band does not have to have the uniformity or other specification requirements typically desirable in a first reflection band.

A process involving localized heat or pressure on the film at the required temperature and length of time is one way to achieve such distorted portions. Thinning the layers shifts the film spectrum to shorter wavelengths, resulting in a different (second) spectrum, and therefore different color, at normal incidence and all higher angles of incidence compared to the original (first) film spectrum.

Distorted areas on a clear or colored multilayer film transmit and reflect different colors than the surrounding base film, resulting in visually striking effects that can be used to draw attention to a card design or a logo. Letters, numbers and small figures can be formed in the distorted portions of the polymeric optical films, causing a local color change in the film due to the changed reflection spectrum. In addition, such distorted features can serve as an added security feature for the card since typical inorganic films on a polymer film base are incompressible and do not flow under pressures at temperatures that a polymer base can tolerate. The film can be distorted before it is laminated into a card. Alternatively, the film's appearance can be changed by heating the film locally as with a laser or other suitable source after it is in the card without substantially affecting the rest of the card structure.

Figure 3:
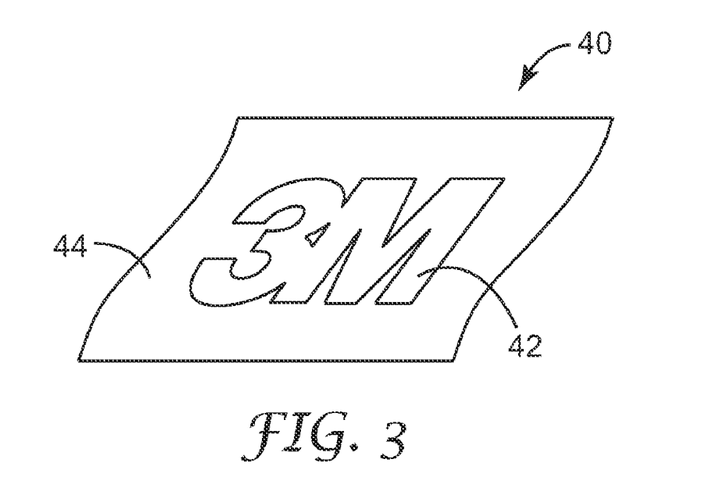
FIG. 3 is a perspective view of a film having embossed or distorted portions.

FIG. 3 shows an example of a film 40 having distorted portions 42. Here, the distorted portions 42 form the shape of a corporate logo. The unique appearance characteristics of the subject films can be further modified by selectively thinning portions of the film to define a feature, pattern, or indicia. Such selective thinning preferably involves more than simply thinning a skin layer or coating, but rather thinning all the optical layers through the thickness of the film at the localized positions so that the perceived color at oblique angles is changed at those positions. This can be done by localized heating, embossing, or exposure to suitable laser radiation. The film shown in FIG. 3 includes portions 42 that have been distorted in the form of a corporate logo. The multilayer optical film 40 also includes undistorted portions or background 44. The pattern can incorporate more than two portions, each having a distinct thickness and hence a distinct color at oblique angles, and can also incorporate a gradual thickness change from one portion of the film to the other rather than step changes.

Once distorted, the multilayer optical film will have a second reflection band in the distorted portions which is different from the original or first reflection band of the film before it was distorted. Depending on the amount of distortion, such films or filters incorporating such films may no longer block infrared light adequately enough to be detected by card sensing systems. To compensate for this effect, an additional IR blocking layer can be added to the distorted portions of the multilayer optical film.

Figure 4:
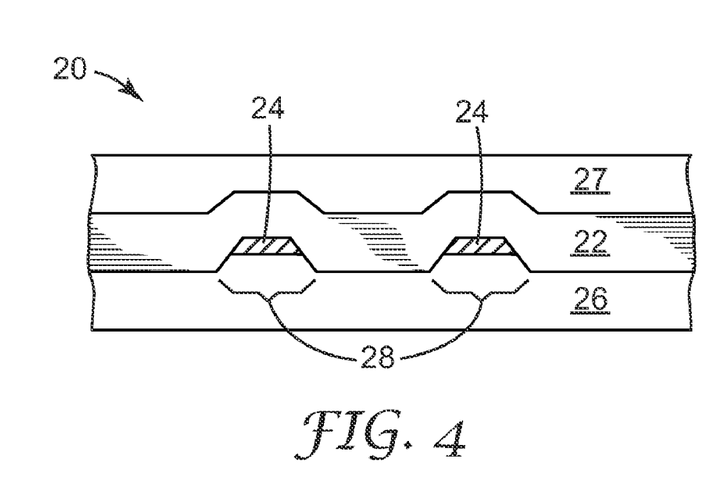
FIG. 4 is a schematic diagram showing a filter according to one embodiment.

FIG. 4 shows a filter 20 comprising a multilayer optical film layer 22 having distorted portions 28. The multilayer optical film 22 has a transparent outer layer 26 disposed on a first major side of the MOF 22. An IR blocking material 24 is added between the MOF 22 and the transparent outer layer 26. The IR blocking material 24 is selectively disposed only in the distorted portions 28 of the MOF 22. Optionally, the IR blocking material 24 can be disposed in other portions of the MOF 22, depending on the optical characteristics of the IR blocking material and the desired optical characteristics of the filter 20, as well as, ultimately the optical characteristics of the final product for which the filter is to be used. Notably, once laminated with the transparent outer layer 26, the filter 20 is flat in the distorted portions, as shown in FIG. 4. The transparent outer layer 26 typically consists essentially of PVC. Other plastic materials can also be used, provided they are transparent in the visible region of the spectrum. Examples of suitable plastics include other polymer materials (e.g. acrylics, polyethylenes, etc.).

Optionally, a second outer layer 27 can also be added on the opposite (second) side of the MOF 22. The second layer 27 can be transparent, translucent, or opaque. The second layer can also include a second multilayer optical film, different or the same as the first multilayer optical film. For example, the second MOF can have additional distorted features that do not substantially overlap with the distorted features of the first MOF. Alternately, the second MOF could have an IR reflection band that blocks IR in the distorted portions of the first film. Once laminated with the second layer, the filter can be flat in the distorted portions on the second side of the MOF, depending on the type of second layer used.

Figure 6:
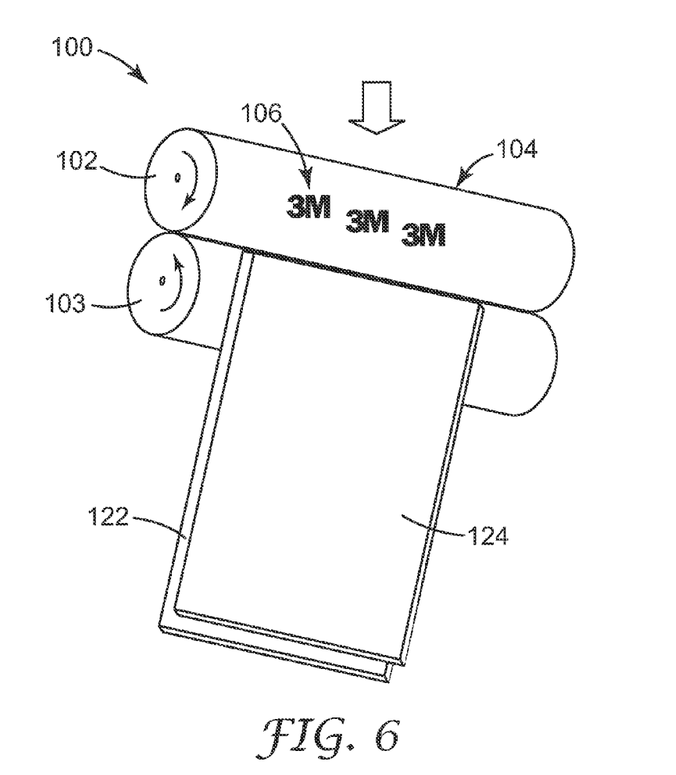
FIG. 6 is a schematic diagram showing the apparatus for making a filter according to a second embodiment.

The IR blocking material can be added to the MOF 22 of filter 20 in several ways. For example, the IR blocking material can be added in the form of a transfer layer as shown in FIG. 6. Alternatively, the IR blocking material can be printed or painted onto the multilayer optical film, as described below.

Figure 5:
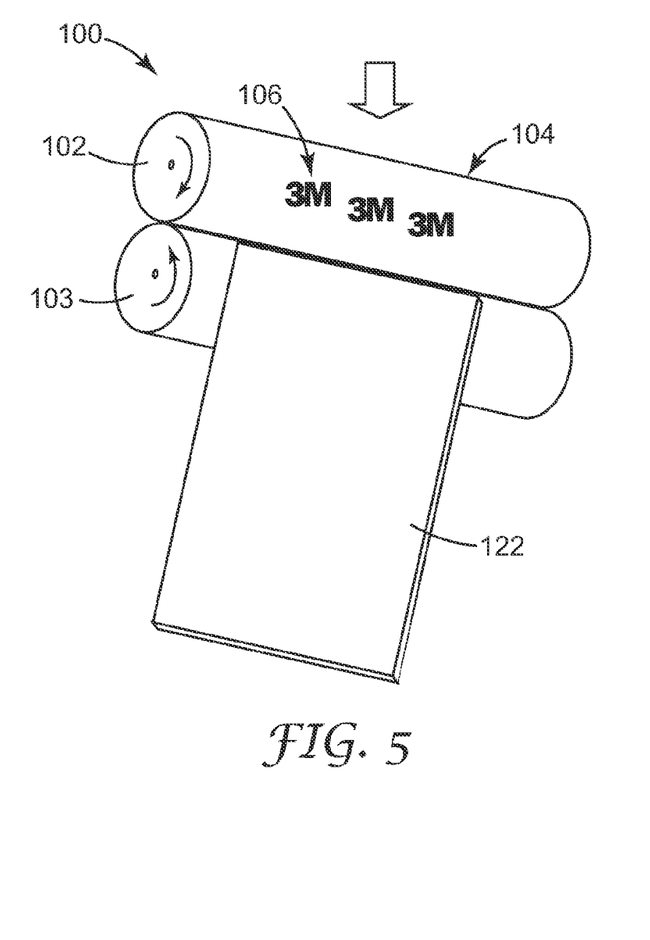
FIG. 5 is a schematic diagram showing the apparatus for making a filter according to one embodiment.

FIG. 5 shows an embossing tool 100 that can be used for producing a filter according to the present disclosure. In FIG. 5 a multilayer optical film 122 is provided. The MOF is selected to have a first reflection band in the desired spectral region. For example the MOF can have a single reflection band in the infrared portion of the spectrum (e.g. 800-1000 nm) and transmit all other wavelengths. The film is distorted by feeding it through a pair of heated rotating drums (102 and 103). One of the drums (102) has an embossed plate (104) disposed thereon. When the multilayer optical film 122 is fed through the embossing tool 100, the embossed feature 106 on the embossed plate 104 is depressed into the MOF 122 thus distorting portions of the MOF. The distorted portions will have a second reflection band, different from the first reflection band, as described previously.

Figure 5A:
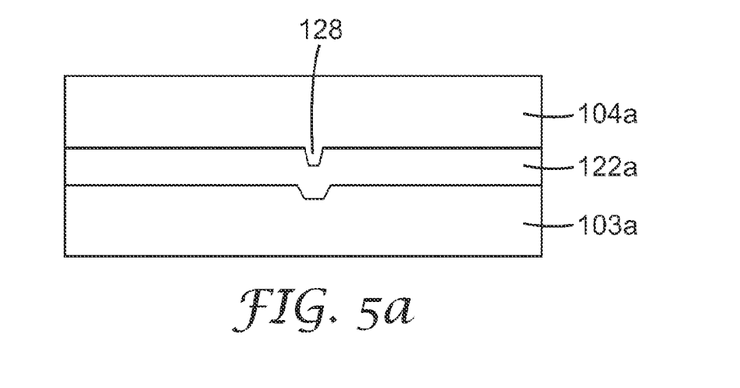
FIG. 5a is a cross-sectional view of the apparatus shown in FIG. 5.

FIG. 5a shows a cross-sectional view of the multilayer optical film as it is fed through the embossing tool 100. In FIG. 5a, the MOF 122a is shown between the embossed plate 104a and the nip plate 103a (located on the nip roll 103). The embossed plate 104a and the nip plate 103a have portions that, when pressed together, allow the film to be distorted to conform to the shapes of the embossed feature 128 portions of the plates. The embossed feature can be shaped in the form of letters, numbers, logos, emblems, or the like. After processing, the resulting multilayer optical film contains the distorted portions, shaped similarly to the embossed feature on the plates.

In FIG. 6 the embossing tool of FIG. 5 is used, but here the MOF 122 is fed through the tool together with a transfer layer 124 (e.g. an ink transfer layer or other layer containing IR blocking material). After processing by the embossing tool 100, the transfer layer can be peeled away, leaving only portions of the transfer layer disposed in the distorted or embossed portions of the MOF. Feeding the MOF and the transfer layer 124 through the tool together, provides registration of the transfer layer and the deformed portions once the transfer layer is peeled away from the MOF. For use in IR blocking applications, the transfer layer can contain IR blocking material, so that once peeled away, the IR blocking material resides only in the distorted portions of the film.

Figure 7:
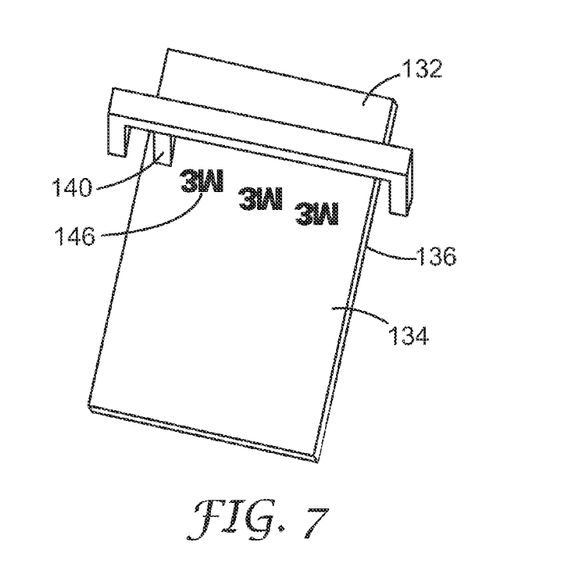
FIG. 7 is a schematic diagram showing the apparatus for making a filter according to a third embodiment.

FIG. 7 shows an alternative method of transferring an IR blocking material to a multilayer optical film, which has been previously embossed by a tool such as embossing tool 100 shown in FIG. 5. In FIG. 7, the embossed multilayer optical film 132 has a first side 134 and a second side 136. If the film is embossed, as in the present embodiment, the first side will contain the indented side of the distorted portions of the MOF, while the second side will contain the raised side of the distorted portions. If the film is distorted using other means (e.g. scored or scribed) the film can be flat on the second side. In FIG. 7 a print head 140 is used to supply digitally opaque ink 146 in registration with the distorted portions of the MOF.

Alternatively, transferring the IR blocking material to the MOF can be done by running an ink ribbon between the embossed tool and the MOF. The transfer could be done by impact or be heat assisted. Other methods of transferring IR blocking material include painting digitally opaque material over the distorted portions of the MOF. The IR blocking material can alternatively be transferred to the transparent outer layer and subsequently laminated to the MOF, as long as the distorted portions are in registration with d the IR blocking material is ensured.

Filters constructed as described herein can be used alone or as a pre-laminate that is further laminated with additional layers to form other articles. For example, an IR blocking filter can be used as an inner layer in a visible light transmissive financial transaction card. Although the present disclosure used such a card as an exemplary use of an IR filter, filters comprising multilayer optical films having distorted portions and IR blocking material can also be used in other applications, as will be apparent to those skilled in the art.

While the invention is amenable to various modifications and alternative forms, specifics thereof have been shown by way of example in the drawings and the detailed description. It should be understood, however, that the intention is not to limit the invention to the particular embodiments described.

On the contrary, the intention is to cover modifications, equivalents, and alternatives falling within the spirit and scope of the invention as defined by the appended claims.

What is claimed is:

1. A filter, comprising:
   a multilayer optical film (MOF) having a first reflection band, the MOF including indented distorted portions, the indented distorted portions having a second reflection band different from the first reflection band;
   a transparent outer layer disposed on a first side of the MOF; and
   an infrared (IR) blocking material residing on the MOF and between the transparent outer layer and the MOF, wherein the IR blocking material is selectively disposed in the indented distorted portions.

2. The filter of claim 1, wherein the filter transmits visible light.

3. The filter of claim 1, wherein the filter substantially blocks infrared light.

4. The filter of claim 1, wherein the first reflection band is an infrared reflection band.

5. The filter of claim 1, wherein the first reflection band is one of a plurality of reflection bands.

6. The filter of claim 1, wherein the transparent outer layer consists essentially of polyvinyl chloride (PVC).

7. The filter of claim 1, further comprising a second outer layer disposed on a second side of the MOF opposite from the first side.

8. The filter of claim 7, wherein the second outer layers is opaque.

9. The filter of claim 7, wherein the second outer layer consists essentially of PVC.

10. The filter of claim 7, wherein the filter is flat in the distorted portions.

11. A visible light transmissive card comprising the filter of claim 1.

* * * * *

UNITED STATES PATENT AND TRADEMARK OFFICE
CERTIFICATE OF CORRECTION

PATENT NO.      : 7,636,193 B2                                            Page 1 of 1
APPLICATION NO. : 11/381261
DATED           : December 22, 2009
INVENTOR(S)     : Bellanca et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this

Ninth Day of November, 2010

David J. Kappos
*Director of the United States Patent and Trademark Office*